United States Patent
Ngo et al.

(10) Patent No.: US 9,537,582 B2
(45) Date of Patent: Jan. 3, 2017

(54) GALVANICALLY-ISOLATED DATA TRANSMISSION DEVICE

(71) Applicants: STMicroelectronics (Tours) SAS, Tours (FR); Universite Francois Rabelais, Tours (FR)

(72) Inventors: Sophie Ngo, Tours (FR); Arnaud Florence, Saint Antoine du Rocher (FR); Daniel Alquier, Tours (FR); Edgard Jeanne, Saint Cyr sur Loire (FR)

(73) Assignees: STMICROELECTRONICS (TOURS) SAS, Tours (FR); UNIVERSITE FRANCOIS RABELAIS, Tours (FR)

( * ) Notice: Subject to any disclaimer, the term of this patent is extended or adjusted under 35 U.S.C. 154(b) by 730 days.

(21) Appl. No.: 13/675,847

(22) Filed: Nov. 13, 2012

(65) Prior Publication Data

US 2013/0135970 A1    May 30, 2013

(30) Foreign Application Priority Data

Nov. 25, 2011    (FR) ...................................... 11 60816

(51) Int. Cl.
H04B 1/02    (2006.01)
H04B 11/00    (2006.01)

(52) U.S. Cl.
CPC ...................................... *H04B 11/00* (2013.01)

(58) Field of Classification Search
None
See application file for complete search history.

(56) References Cited

U.S. PATENT DOCUMENTS

| 5,410,205 | A | * | 4/1995 | Gururaja | ............... B06B 1/0614 |
| | | | | | 310/321 |
| 5,594,705 | A | | 1/1997 | Connor et al. | |
| 5,619,476 | A | * | 4/1997 | Haller et al. | ................. 367/181 |
| 5,870,351 | A | * | 2/1999 | Ladabaum et al. | ........... 367/163 |
| 5,906,580 | A | * | 5/1999 | Kline-Schoder | ........ B06B 1/064 |
| | | | | | 310/334 |
| 6,314,057 | B1 | * | 11/2001 | Solomon et al. | ............. 367/174 |
| 6,525,566 | B2 | | 2/2003 | Haigh et al. | |
| 6,625,084 | B1 | * | 9/2003 | Payton | ......................... 367/134 |

(Continued)

FOREIGN PATENT DOCUMENTS

FR    2954014 A1 *  6/2011

OTHER PUBLICATIONS

Watson, Bob. "FSK: signals and demodulation." Watkins-Johnson Company Tech—notes 7.5 (1980).*

(Continued)

*Primary Examiner* — James Hulka
*Assistant Examiner* — Jonathan Armstrong
(74) *Attorney, Agent, or Firm* — Slater Matsil, LLP

(57) ABSTRACT

A data transmission device includes a coder configured to code the data into a multifrequency signal. A first array of ultrasonic transducers with a vibrating membrane is disposed on a first surface of a wafer. The first array configured to convert the signal into a multifrequency acoustic signal propagating in the wafer. A second array of ultrasonic transducers is disposed on a second surface of the wafer. The second array includes at least two assemblies of vibrating membrane ultrasonic transducers having resonance frequencies equal to two different frequencies of the multifrequency signal.

24 Claims, 3 Drawing Sheets

(56) References Cited

U.S. PATENT DOCUMENTS

| | | | |
|---|---|---|---|
| 6,775,388 B1* | 8/2004 | Pompei | B06B 1/0292 |
| | | | 367/181 |
| 7,489,593 B2* | 2/2009 | Nguyen-Dinh et al. | 367/181 |
| 7,514,844 B2* | 4/2009 | Unkrich | H03H 9/584 |
| | | | 310/317 |
| 2007/0085632 A1* | 4/2007 | Larson et al. | 333/187 |
| 2007/0086274 A1 | 4/2007 | Nishimura et al. | |
| 2007/0096847 A1* | 5/2007 | Trutna et al. | 333/133 |
| 2007/0170815 A1* | 7/2007 | Unkrich | H03H 9/584 |
| | | | 310/318 |
| 2010/0251823 A1* | 10/2010 | Adachi | A61B 8/00 |
| | | | 73/606 |
| 2012/0098625 A1* | 4/2012 | Martin et al. | 333/193 |

OTHER PUBLICATIONS

Li, Chuan, David Hutchins, and Roger J. Green. "Short-range ultrasonic digital communications in air." Ultrasonics, Ferroelectrics, and Frequency Control, IEEE Transactions on 55.4 (2008): 908-918.*

Wygant, Ira O., Mario Kupnik, and Butrus T. Khuri-Yakub. "Analytically calculating membrane displacement and the equivalent circuit model of a circular CMUT cell." 2008 IEEE Ultrasonics Symposium. IEEE, 2008.*

French Search Report received in French Application No. 1160816, mailed Jul. 26, 2012, 7 pages.

* cited by examiner

GALVANICALLY-ISOLATED DATA TRANSMISSION DEVICE

This application claims the priority benefit of French patent application number 1160816, filed on Nov. 25, 2011, which is hereby incorporated by reference to the maximum extent allowable by law.

TECHNICAL FIELD

The present invention relates to a galvanically-isolated data transmission device.

BACKGROUND

Galvanic isolation aims at suppressing any continuous electric conduction between two portions of an electric or electronic circuit, the reference voltages of the portions being different, while allowing exchanges of signals between these two portions. Such an isolation may for example be used to isolate a control circuit referenced to ground from the control terminals of a power circuit referenced to a high-voltage terminal, for example, the mains.

To obtain a galvanic isolation, it has been provided to form structures made of two opposite arrays of capacitive micromachined ultrasonic transducers, on either side of a support.

FIG. 1 illustrates a simple capacitive micromachined ultrasonic transducer (CMUT) formed on a support.

A first conductive layer 32 forms a first electrode of the transducer and extends on a substrate 30, for example, made of silicon. A membrane 34 of dielectric material, for example silica nitride, is formed above conductive layer 32. Membrane 34 is provided to define a cavity 36 above conductive layer 32. To obtain such a structure, a sacrificial layer may be used. The membrane does not extend over the entire surface of the first electrode, which enables the formation of a contact on this electrode.

A conductive region 38 is formed at the surface of membrane 34, opposite to cavity 36. Conductive region 38 forms the second electrode of the transducer. A first electric contact 40 is formed at the surface of first electrode 32 and a second electric contact 42 is formed at the surface of second electrode 38. A D.C. bias voltage generator 44 and an A.C. signal source 46 are placed in series between the two electrodes.

The device of FIG. 1 operates as follows. When a D.C. voltage is applied between electrodes 32 and 42, membrane 34 is attracted towards first electrode 32 by coulomb forces. When an A.C. voltage is added to the D.C. voltage provided by generator 44, the membrane oscillates as a response to this A.C. signal, which generates an ultrasonic acoustic wave 48.

Conversely, if a D.C. voltage is applied between the electrodes of the transducer and the device receives an ultrasonic wave, the membrane starts vibrating. This vibration generates an A.C. voltage between the electrodes, which may be detected at the level of source 46.

FIG. 2 illustrates a device of galvanic isolation by acoustic link.

This device comprises a substrate 50 on either side of which are formed two arrays of capacitive micromachined ultrasonic transducers.

A layer 52A of a heavily-insulating material, for example, thermal silicon oxide or another thermal oxide, extends on a first surface of substrate 50. Substrate 50 is made of a material capable of transmitting acoustic waves, for example, silicon or glass. An array 54A of ultrasonic transducers is formed at the surface of the insulating material layer 52A. Array 54A forms the primary of the galvanic isolation device while a second array 54B formed on the second surface of substrate 50 forms its secondary.

Array 54A comprises several transducers in parallel. This array comprises a conductive layer 56A at the surface of insulating layer 52A, which forms a first electrode common to all transducers. Conductive layer 56A may be made of heavily-doped polysilicon or of a metal.

A membrane 58A is formed on first electrode 56A. Membrane 58A does not extend over the entire surface of electrode 56A to enable the formation of a contact on electrode 56A.

Cavities 60A are defined by membrane 58A above electrode 56A. Membrane 58A may for example be made of silicon nitride and be formed by low-pressure chemical vapor deposition (LPCVD). Cavities 60A define the surfaces of the elementary transducers of array 54A.

Conductive regions 62A are formed at the surface of membrane 58A opposite to cavities 60A. Conductive regions 62A form the second electrodes of the transducers of array 54A. Conductive regions 62A are, for example, made of aluminum. It should be noted that, unlike what is shown, second electrodes 62A may be formed of a single conductive layer covering the surface of membrane 58A, while this conductive layer is located at least opposite of cavities 60A.

One (or several) contacts 64A are formed on first electrode 56A. A contact 66A is also formed on second electrodes 62A. The elementary transducers formed in array 54A are thus connected in parallel. To operate this device, a D.C. bias voltage, in series with the A.C. voltage which is desired to be sent, is applied between contacts 64A and 66A.

A structure identical to that formed on the first surface is formed on the second surface of substrate 50. The elements forming the transducer array on the second surface are referred to in the same way as the elements forming the transducer array on the first surface, by replacing suffix "A" with "B." A D.C. bias voltage is applied between contacts 64B and 66B.

The device of FIG. 2 enables the transmission of a signal having a frequency corresponding, or very close, to the resonance frequency of the transducers on the emitter side. For the reception of this signal, the resonance frequency of the transducers on the receiver side must correspond to the resonance frequency of the transducers on the emitter side.

The transmission device of FIG. 2, however, does not enable the transmission of multi-frequency signals, unless the structure of FIG. 2 is multiplied on the two surfaces of a substrate, each structure having different resonance frequencies, or unless other more complex solutions are envisaged.

FIGS. 3 and 4 schematically illustrate circuits for coding and transmitting binary data implementing a galvanic isolation device such as that in FIG. 2.

In FIG. 3, a square input signal IN is coded by a coding device 70. Coding device 70 ensures the conversion of signal IN into a signal that can be transmitted by a transfer device TR of the type in FIG. 2.

In the case of FIG. 3, coding device 70 is provided to convert a rising edge of signal IN into a signal comprising a succession of two periods of transmission of an acoustic wave, at a same frequency, the two periods being interrupted. A falling edge of signal IN is converted by the coding device into a signal comprising a single period of transmission of an acoustic wave at the same frequency, of same duration as the two periods coding a rising edge. This coding enables the differentiation of a rising edge from a falling edge on the signal at the output of coding device 70.

The signal provided by coding device 70 is sent onto the A.C. power supply voltage of primary E of a galvanic isolation transmission device TR such as that in FIG. 2. Primary E of device TR is provided to oscillate at the coding voltage and thus convert the output signal of the coding device into an acoustic signal. The acoustic signal is then received by secondary R of the device, having a resonance frequency identical to that of the primary.

The received signal is then decoded by a decoder 72 that distinguishes the sequences of two successions of wave transmission (corresponding to a rising edge of signal IN) from isolated wave transmissions (corresponding to a falling edge of signal IN), and that delivers an output signal OUT corresponding to input signal IN.

A disadvantage of the device of FIG. 3 is that it has a limited input frequency (signal IN). The provided coding implies a decrease in the maximum usage frequency by at least a factor two with respect to the maximum transmission frequency of device TR.

In FIG. 4, a square input signal IN is coded by a coding device 74. Coding device 74 converts signal IN into a signal that can be transmitted by a transfer device TR of the type in FIG. 2. In the case of FIG. 4, coding device 74 is provided to transform a rising edge of signal IN into an A.C. signal having a first duration $t_1$, and a falling edge of signal IN into an A.C. signal of same frequency for a second duration $t_2$, different from duration $t_1$ (in the shown example, shorter than $t_1$).

The signal delivered by coding device 74 is then applied as an A.C. input signal of primary E of a transmission structure such as that in FIG. 2 (TR). A D.C. voltage is applied on this primary so that the CMUT cells of the primary generate an acoustic signal. The acoustic signal transmitted by the primary is received on secondary R of this device.

The received signal is then decoded by a decoder 76 that distinguishes durations $t_1$ and $t_2$, corresponding to a rising edge and to a falling edge of signal IN. The decoder provides a signal OUT which is an image of input signal IN.

A disadvantage of a data transmission device such as that in FIG. 4 is that the design of decoding circuit 76 is relatively complex. Indeed, to distinguish durations $t_1$ and $t_2$, an association of a filter, of a demodulator, and of a decoder, which are in practice relatively complex and expensive, must be used.

Thus, there is a need for a galvanically-isolated data transmission device overcoming all or part of the above disadvantages.

SUMMARY OF THE INVENTION

An embodiment provides a device allowing a data transmission by a galvanically-isolated system which is particularly simple to implement.

More specifically, an embodiment provides a galvanically-isolated device allowing the transmission of data coded over various frequencies, without requiring any complex data decoding.

Thus, an embodiment provides a galvanically-isolated data transmission device, comprising circuitry for coding the data in a multifrequency signal. A first array of ultrasonic transducers with a vibrating membrane is formed on a first surface of a wafer and is capable of converting the signal into a multifrequency acoustic signal propagating in the wafer. A second array of ultrasonic transducers is formed on a second surface of the wafer. The second array comprises at least two assemblies of vibrating membrane ultrasonic transducers having resonance frequencies equal to two different frequencies of the multifrequency signal.

According to an embodiment, the device further comprises a circuit for controlling a D.C. voltage applied to the first array of vibrating membrane ultrasonic transducers, according to the frequency of the multifrequency signal.

According to an embodiment, the controller acts on the D.C. voltage applied to the first array of vibrating membrane ultrasonic transducers so that the resonance frequency of the first array corresponds to the successive frequencies of the multifrequency signal.

According to an embodiment, the first array of vibrating membrane ultrasonic transducers comprises at least two assemblies of vibrating membrane ultrasonic transducers having resonance frequencies equal, respectively, to two different frequencies of the multifrequency signal.

According to an embodiment, the first assembly of vibrating membrane ultrasonic transducers of the second array has a different geometry than the second assembly of vibrating membrane ultrasonic transducers of the second array.

According to an embodiment, the first assembly of vibrating membrane ultrasonic transducers of the second array receives a first D.C. voltage different from a second D.C. voltage applied to the second assembly of vibrating membrane ultrasonic transducers of the second array.

According to an embodiment, the vibrating membrane ultrasonic transducers of the first and second assemblies of the second array alternate the surface of the second side of the wafer.

An embodiment provides a use of the above device for the transmission of binary data.

According to an embodiment, the binary data are converted into a signal having a first frequency on each rising edge of the binary data and into a signal having a second frequency on each falling edge of the binary data.

BRIEF DESCRIPTION OF THE DRAWINGS

The foregoing and other features and advantages will be discussed in detail in the following non-limiting description of specific embodiments in connection with the accompanying drawings.

For clarity, the same elements have been designated with the same reference numerals in the different drawings and, further, as usual in the representation of electronic components, the various drawings are not to scale.

DETAILED DESCRIPTION OF ILLUSTRATIVE EMBODIMENTS

To transmit data by using a galvanic isolation device, the data is provided to be frequency-coded. The galvanic isolation device is accordingly adapted to transmit a multifrequency signal, and has the non-negligible advantage of requiring no complex decoding system on the secondary side to reconstruct the data, as will be seen hereafter.

Figure 1:
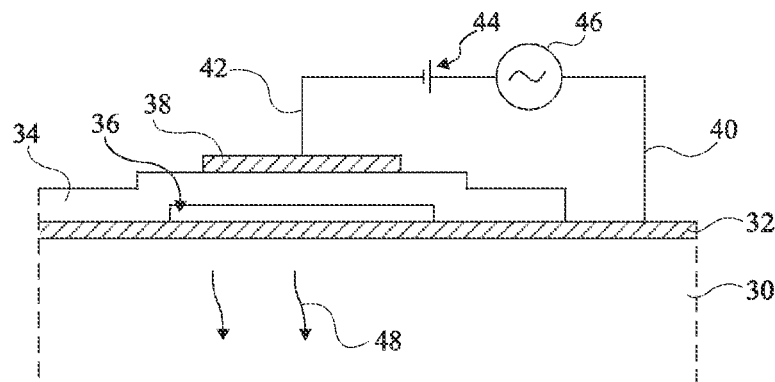
FIG. 1 illustrates a known capacitive micromachined ultrasonic transducer.
Figure 2:
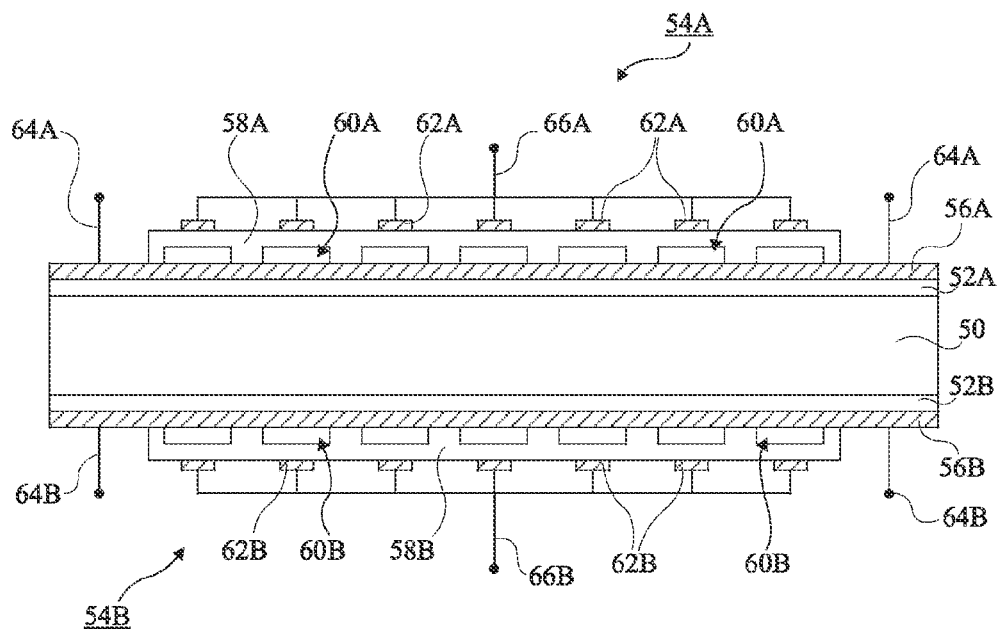
FIG. 2 illustrates a known device of galvanic isolation by acoustic link.
Figure 3:
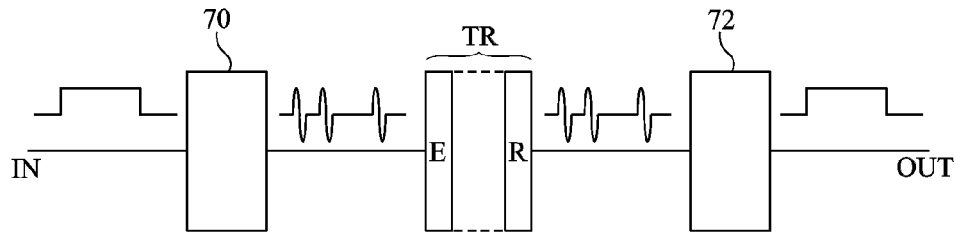
FIGS. 3 and 4 schematically illustrate circuits for transmitting binary data implementing a galvanic isolation device such as that in FIG. 2.
Figure 4:
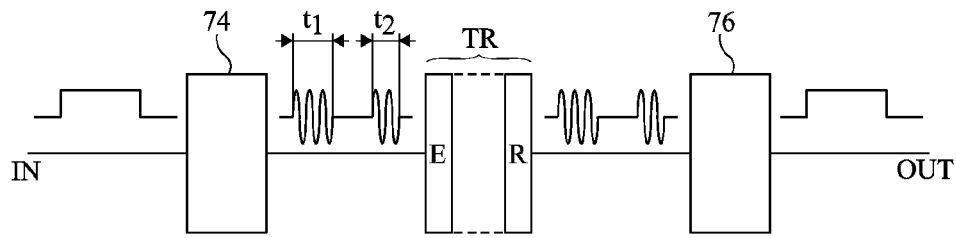
Figure 5:
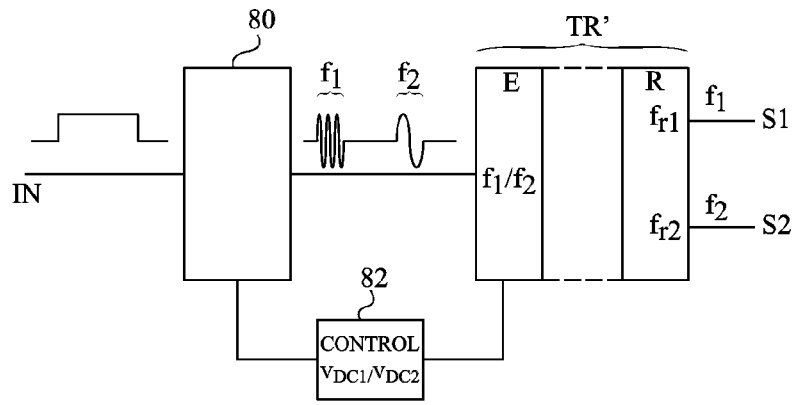
FIG. 5 illustrates a data transmission device according to an embodiment of the present invention.

FIG. 5 illustrates an example of an embodiment of a galvanically-isolated data transmission device provided herein.

An input signal IN, which is square in the shown example, is frequency-coded by a coding system 80. In the illustrated example, a rising edge of signal IN is converted into a signal at a first frequency $f_1$, and a falling edge of signal IN is converted into a signal at a second frequency $f_2$. The signals at frequencies $f_1$ and $f_2$ can be transmitted for identical durations, if desired.

The signal at the output of coder 80 is sent onto the input of a galvanically-isolated acoustic transmission device TR'. The primary of the transmission device is provided to transform the A.C. signal of several frequencies that it receives as an input into an acoustic signal of same frequencies, as will be seen hereafter.

Acoustic transmission device TR' has two outputs S1 and S2 capable of being activated, respectively, on reception of acoustic signals at frequencies $f_1$ and $f_2$. To achieve this, secondary R of acoustic transmission device TR' comprises two assemblies of elementary CMUT cells having different resonance frequencies, $f_{r1}$ and $f_{r2}$, respectively corresponding to frequencies $f_1$ and $f_2$.

This structure of the secondary of the transmission device may be obtained in different ways. In particular, the resonance frequencies of the two assemblies of elementary cells of the secondary may be adjusted by modifying the very structure of the corresponding CMUTs.

Indeed, the natural frequency of a CMUT device depends on the geometry of the CMUT according to the following relation:

$$f_0 = \frac{1}{2\pi}\sqrt{\frac{k_{app}}{m}}$$

$$\text{with: } k_{app} = s\left(\frac{16 \cdot E \cdot e_m^3}{3R^4(1-v)} + 4\frac{e_m \cdot \sigma}{R^2}\right),$$

where S is the surface area, m is the thickness, R is the radius of the membrane of the CMUT device (if the membrane of the CMUT device is circular, R corresponds to an approximate radius thereof), E is Young's constant, v Is Poisson's ratio, and σ is the stress of the material forming the membrane of the CMUT device.

Further, the resonance frequency of a CMUT device is linked to the natural frequency thereof by the following relation:

$$f_r^2 = f_0^2 \left(\frac{1}{1 - \alpha \cdot V_{DC}}\right)$$

where α is a constant and $V_{DC}$ is the D.C. voltage applied on the two electrodes of the CMUT device.

Thus, a given CMUT device geometry has a corresponding resonance frequency of this device. A D.C. bias voltage of the CMUT device also has a corresponding resonance frequency. The cells of the first and second assemblies can thus be differentiated either by their dimensions, or by the material forming their membranes, or by the D.C. bias voltage which is applied thereto.

On the side of primary E of transmission device TR', the conversion of several output signal frequencies of coding device 80 into acoustic signals of different frequencies is performed by adjusting the resonance frequency of the CMUT devices on the emitter side based on frequency $f_1$ or $f_2$ of the output signal of coding device 80.

This is done by a controller 82 (labeled CONTROL $V_{DC1}/V_{DC2}$), which receives input data from coder 80. The input data are an image of the coded frequency. The controller modifies the D.C. bias voltage of the CMUT devices on the primary side according to these data, between two voltages $V_{DC1}$ and $V_{DC2}$. This enables the resonance frequency of the CMUT devices of the primary to be modified so that their resonance frequencies correspond to the frequency of the output signal of the coder.

It should be noted that the elementary CMUT devices of the array of CMUT devices forming the primary of the transmission device can also be divided in two or more portions having different geometries, to have different natural frequencies, and thus different resonance frequencies.

Elementary CMUT devices of different natural frequency may form primary E in association with controller 82 for controlling either the D.C. voltage applied to all the CMUTs, or several different D.C. voltages applied to each CMUT assembly. The devices can also be used without the controller 82, for example, when the resonance frequency of the different elementary devices of the primary corresponding to frequencies $f_1$ and $f_2$ for a same D.C. voltage which is applied thereto, with no time variation of this voltage.

It should be noted that, similarly to what has been discussed herein, it may be provided to transfer data by means of transmission device TR' coded over more than two different frequencies. The CMUT array of secondary R would accordingly be adapted to contain more than two assemblies of CMUTs of different resonance frequencies. The controller 82 and/or the CMUTs of primary E would also be adapted accordingly.

A galvanically-isolated transmission device such as provided herein may also be used to directly transmit multifrequency data, independently from any coding device. In this case, the resonance frequencies of the CMUT devices of the primary will be adapted to the frequencies to be transmitted. This may be done by setting, either by the geometry, or by the D.C. biasing, the resonance frequency of certain CMUT devices of the primary to a first frequency to be transmitted, the frequency of other CMUT devices of the primary to a second frequency to be transmitted. This may also be done by modifying the controller so that it applies an adequate D.C. voltage to the assembly or to part of the CMUTs of the primary according to the input signal frequency. A detector for detecting this frequency is in this last case useful to adapt the resonance frequency of at least part of the CMUTs of the primary to the frequency to be transmitted.

Figure 6:
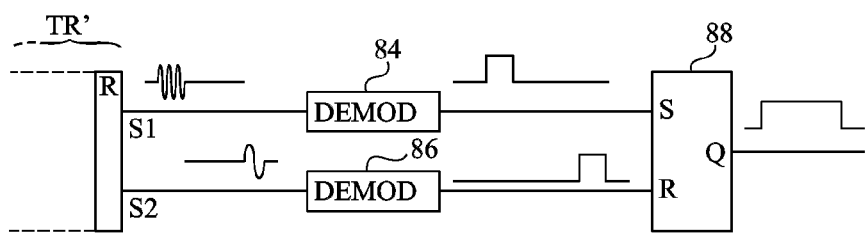
FIG. 6 illustrates an example of a data processing circuit at the output of the device of FIG. 5.

FIG. 6 illustrates an example of a circuit for processing the data at the output of the device of FIG. 5, in the case where the data at the input of the circuit of FIG. 5 are a binary signal.

At the output of the secondary of galvanically-isolated transmission device TR', two signals are obtained. The first signal (terminal S1) has periods of oscillation at frequency $f_1$ and the second signal (terminal S2) has periods of oscillation at frequency $f_2$.

First output signal S1 runs through a first demodulator 84 and second output signal S2 runs through a second demodulator 86. Demodulators 84 and 86 provide, at their output, square signals in the high state in phases of reception of an A.C. input signal.

An RS-type gate 88 receives on its set input (SET) the signal originating from first modulator 84 and on its reset input (RESET) the signal originating from second modulator 86. Upon receipt of a signal at the set input, the output of gate 88 will go high and upon receipt of a signal at the reset input, the output of gate 88 will go low. Accordingly, the output signal of gate 88 thus restores signal IN at the device input.

Figure 7:
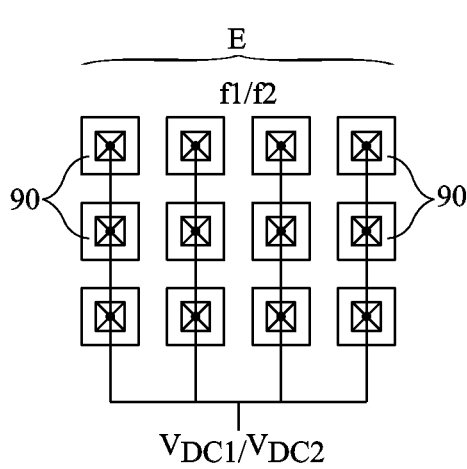
FIGS. 7 to 9 illustrate different alternative embodiments of the acoustic transducers on the primary and on the secondary of a transmission device according to an embodiment of the present invention.
Figure 7:
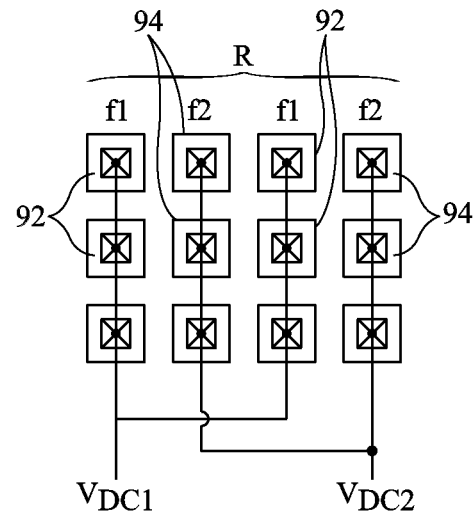
Figure 8:
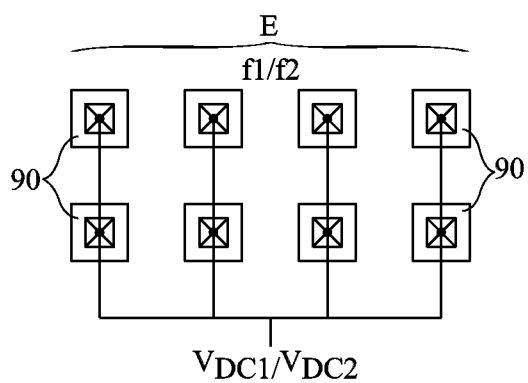
Figure 8:
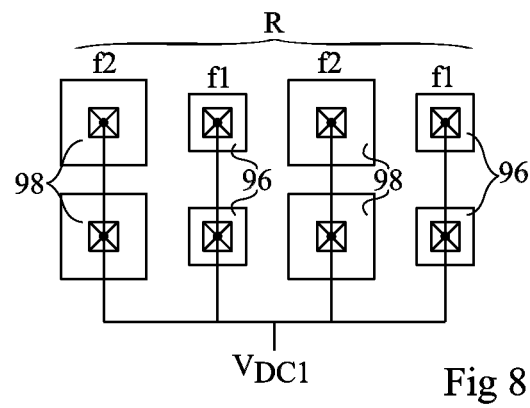
Figure 9:
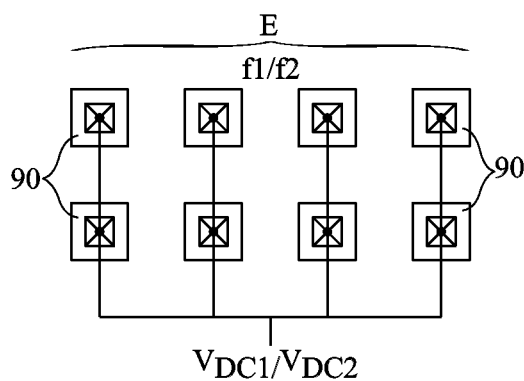
Figure 9:
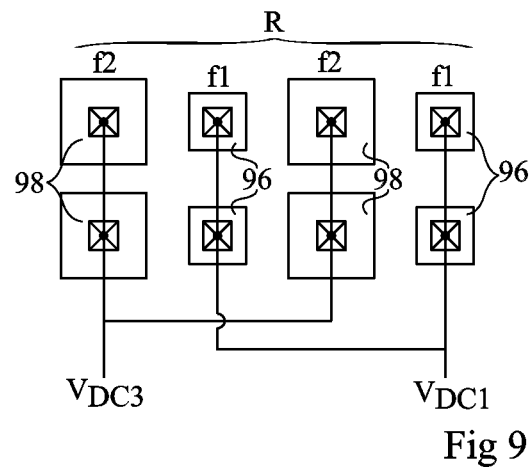

FIGS. 7 to 9 illustrate different alternative embodiments of the CMUT devices on the primary and on the secondary of a transmission device such as provided herein. More specifically, these drawings illustrate, in simplified top view, the size of membranes of elementary CMUT devices of primary E and of secondary R in different configurations of the device.

In FIG. 7, primary E of transmission circuit TR' comprises an array of CMUT cells 90. All cells have the same size. The D.C. power supply terminals of cells 90 receive a voltage $V_{DC1}$ or $V_{DC2}$ enabling setting of the resonance frequency of cells 90 to a frequency $f_1$ or to a frequency $f_2$ (coded frequency).

Secondary R of transmission circuit TR' comprises an array of CMUT cells 92/94. All cells have the same size and the same structure, and also have the same size and the same structure as cells 90. A first assembly of cells 92 receives, on its D.C. voltage supply terminals, voltage $V_{DC1}$, and a second cell assembly 94 receives, on its D.C. voltage supply terminals, voltage $V_{DC2}$. Thus, the resonance frequency of the first assembly is equal to $f_1$ and the resonance frequency of the second assembly is equal to $f_2$.

In FIG. 8, primary E of transmission circuit TR' comprises an array of CMUT cells 90 identical to primary E of FIG. 7, and the D.C. power supply terminals of cells 90 receive a voltage $V_{DC1}$ or $V_{DC2}$ according to the frequency of the coded signal received by the primary.

Secondary R of transmission circuit TR' comprises an array of CMUT cells 96/98. All cells 96/98 receive on their D.C. voltage supply terminals a same voltage $V_{DC1}$. A first assembly of cells 96 comprises cells having a size and a structure identical to those of cells 90 of the primary. A second assembly of cells 98 comprises cells of different size than cells 96. The size of cells 98 is provided so that, under D.C. voltage $V_{DC1}$, the corresponding cells have a resonance frequency equal to $f_2$. Thus, the resonance frequency of the first assembly is equal to $f_1$ and the resonance frequency of the second assembly is equal to $f_2$.

In FIG. 9, primary E of transmission circuit TR' comprises an array of CMUT cells 90 identical to primary E of FIG. 7, and the D.C. power supply terminals of cells 90 receive a voltage $V_{DC1}$ or $V_{DC2}$.

Secondary R of transmission circuit TR' comprises an array of CMUT cells 96/98 of same dimensions as the cells of FIG. 8. A first cell assembly 96 comprises cells which receive a first voltage $V_{DC1}$ on their D.C. voltage supply terminals, which implies a resonance frequency of its cells equal to $f_1$. Cells 98 receive a third voltage $V_{DC3}$ on their D.C. voltage supply terminals. The third voltage is provided for the cells to have a resonance frequency equal to $f_2$, given their sizes and structures.

Specific embodiments of the present invention have been described. Various alterations and modifications will occur to those skilled in the art. In particular, it should be noted that the alternation of cells of different resonance frequencies on the secondary of transmission device TR' may be different from that provided in relation with FIGS. 8 and 9.

It should further be noted that it may also be provided to form structures enabling to transmit more than two frequencies, a device for coding data over more than two frequencies being usable at the input of the transmission device.

Various embodiments with different variations have been described hereabove. It should be noted that those skilled in the art may combine various elements of these various embodiments and variations without showing any inventive step. In particular, "wafer" 50 may be formed of an assembly of substrates, for example, by bonding. Similarly, additional layers may be deposited on at least one of the surfaces of the structure to perform central frequency or bandwidth adjustments.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A data transmission device, comprising:
   a coder configured to code data into a signal that has successive frequencies comprising a first frequency and a second frequency different from the first frequency;
   a first array of vibrating membrane ultrasonic transducers with a vibrating membrane, disposed on a first surface of a wafer, the first array configured to convert the signal into a acoustic signal propagating in the wafer, the acoustic signal having successive frequencies comprising the first frequency and the second frequency;
   a controller configured to control a D.C. voltage applied to the first array of vibrating membrane ultrasonic transducers, wherein the controller is configured to successively apply a first D.C. voltage and a second D.C. voltage different from the first D.C. voltage to a plurality of cells of the first array, wherein the plurality of cells is used for transmission of the first frequency and the second frequency; and
   a second array of vibrating membrane ultrasonic transducers disposed on a second surface of the wafer opposing the first surface, the second array comprising at least two assemblies of vibrating membrane ultrasonic transducers, a first assembly of the at least two assemblies having a resonance frequency equal to the first frequency and a second assembly of the at least two assemblies having a resonance frequency equal to the second frequency.

2. The device of claim 1, wherein the controller is configured to act on the D.C. voltage applied to the first array of vibrating membrane ultrasonic transducers in order to:
   apply the first D.C. voltage so that the resonance frequency of the first array corresponds to the first frequency of the signal, and
   apply the second D.C. voltage so that the resonance frequency of the first array corresponds to the second frequency of the signal.

3. The device of claim 1, wherein the first assembly of vibrating membrane ultrasonic transducers of the second array has a different geometry than the second assembly of vibrating membrane ultrasonic transducers of the second array.

4. The device of claim 1, wherein the first assembly of vibrating membrane ultrasonic transducers of the second array is configured to receive a third D.C. voltage different from a fourth D.C. voltage applied to the second assembly of vibrating membrane ultrasonic transducers of the second array.

5. The device of claim 1, wherein the first assembly of the vibrating membrane ultrasonic transducers of the at least two assemblies of the second array and the second assembly of the vibrating membrane ultrasonic transducers of the at least two assemblies of the second array alternate at the second surface of the wafer.

6. A data transmission device, comprising:
a coder configured to code data into a signal that has successive frequencies comprising a first frequency and a second frequency different from the first frequency;
a first array of vibrating membrane ultrasonic transducers with a vibrating membrane, disposed on a first surface of a wafer, the first array configured to convert the signal into a acoustic signal propagating in the wafer, the acoustic signal having successive frequencies comprising the first frequency and the second frequency;
a controller configured to control a D.C. voltage applied to the first array of vibrating membrane ultrasonic transducers; and
a second array of vibrating membrane ultrasonic transducers disposed on a second surface of the wafer opposing the first surface, the second array comprising at least two assemblies of vibrating membrane ultrasonic transducers, a first assembly of the at least two assemblies having a resonance frequency equal to the first frequency and a second assembly of the at least two assemblies having a resonance frequency equal to the second frequency;
wherein the data comprises binary data, and wherein the coder is configured to convert the binary data into a first signal having the first frequency on each rising edge of the binary data and into a second signal having the second frequency on each falling edge of the binary data, and wherein there is a delay between the first signal and the second signal.

7. A galvanically-isolated data transmission device, comprising:
a coder configured to code data into a signal having successive frequencies comprising a first frequency and a second frequency different from the first frequency;
a first array of ultrasonic transducers with a vibrating membrane, formed on a first surface of a wafer, capable of converting the signal into an acoustic signal propagating in the wafer, the acoustic signal having successive frequencies comprising the first frequency and the second frequency, wherein a first D.C. voltage is applied to cells of the first array when a frequency of the signal is the first frequency, and a second D.C. voltage different from the first D.C. voltage is applied to the cells of the first array when a frequency of the signal is the second frequency; and
a second array of ultrasonic transducers formed on a second surface of the wafer opposing the first surface, the second array comprising at least two assemblies of vibrating membrane ultrasonic transducers, a first assembly of the at least two assemblies having a resonance frequency equal to the first frequency of the signal and a second assembly of the at least two assemblies having a resonance frequency equal to the second frequency of the signal.

8. The device of claim 7, further comprising a controller configured to control a D.C. voltage applied to the first array of ultrasonic transducers, according to the frequency of the signal, the D.C. voltage applied being according to the first frequency of the signal and the second frequency of the signal.

9. The device of claim 7, wherein the first assembly of vibrating membrane ultrasonic transducers of the second array has a different geometry than the second assembly of vibrating membrane ultrasonic transducers of the second array.

10. The device of claim 7, wherein the first assembly of vibrating membrane ultrasonic transducers of the second array receives a third D.C. voltage different from a fourth D.C. voltage applied to the second assembly of vibrating membrane ultrasonic transducers of the second array.

11. The device of claim 7, wherein the first assembly of the vibrating membrane ultrasonic transducers of the at least two assemblies of the second array and the second assembly of the vibrating membrane ultrasonic transducers of the at least two assemblies of the second array alternate at the second surface of the wafer.

12. A method of communicating data, the method comprising:
coding the data into a signal having successive frequencies comprising a first frequency and a second frequency different from the first frequency;
applying the signal to a first array of ultrasonic transducers with a vibrating membrane, the first array disposed on a first surface of a wafer;
controlling a D.C. voltage applied to the first array of ultrasonic transducers, where the controlling comprises:
applying a first D.C. voltage to a plurality of cells of the first array when a frequency of the signal is the first frequency, and
applying a second D.C. voltage different from the first D.C. voltage to the plurality of cells of the first array when a frequency of the signal is the second frequency;
converting the signal into an acoustic signal propagating in the wafer using the plurality of cells; and
receiving the acoustic signal at a second array of ultrasonic transducers disposed on a second surface of the wafer opposing the first surface, wherein the second array comprises at least two assemblies of vibrating membrane ultrasonic transducers having resonance frequencies equal to two different frequencies of the signal, a first assembly of the at least two assemblies having a resonance frequency equal to the first frequency and a second assembly of the at least two assemblies having a resonance frequency equal to the second frequency.

13. The method of claim 12, further comprising receiving a digital signal containing the data prior to the coding.

14. The method of claim 13, wherein the digital signal is a binary signal and wherein the first frequency of the signal corresponds to a first value of the binary signal and the second frequency of the signal corresponds to a second value of the binary signal.

15. The method of claim 13, further comprising converting the acoustic signal into a received digital signal.

16. The method of claim 15, wherein the received digital signal is substantially identical to the digital signal.

17. The method of claim 12, wherein coding the data comprises converting a binary data into a first signal having the first frequency on each rising edge of the binary data and into a second signal having the second frequency on each falling edge of the binary data, wherein the first signal is spaced apart in time from the second signal.

18. The method of claim 12, wherein
the first D.C. voltage is applied to the first array of ultrasonic transducers so that a resonance frequency of the first array corresponds to the first frequency, and
the second D.C. voltage is applied to the first array of ultrasonic transducers so that the resonance frequency of the first array corresponds to the second frequency.

19. The device of claim 6, wherein the second array of vibrating membrane ultrasonic transducers is configured to generate a first output signal having the first frequency at a first output terminal, and a second output signal having the second frequency at a second output terminal, wherein the device further comprises:
a first demodulator with a first input terminal coupled to the first output terminal, wherein the first demodulator is configured to output a first pulse signal at a third output terminal of the first demodulator in response to the first output signal; and
a second demodulator with a second input terminal coupled to the second output terminal, wherein the second demodulator is configured to output a second pulse signal at a fourth output terminal of the second demodulator in response to the second output signal.

20. The device of claim 19, further comprising an R-S type gate, wherein the third output terminal of the first demodulator is coupled to a first input terminal of the R-S type gate, and the fourth output terminal of the second demodulator is coupled to a second input terminal of the R-S type gate, and wherein an output terminal of the R-S type gate provides an output signal substantially the same as the binary data.

21. The device of claim 6, wherein the controller is configured to successively apply a first D.C. voltage and a second D.C. voltage that is different than the first D.C. voltage to a plurality of cells of the first array, the plurality of cells being used for transmission of the first frequency and the second frequency.

22. The method of claim 17, further comprising:
demodulating a first output of the first assembly of the at least two assemblies of vibrating membrane ultrasonic transducers into a first positive pulse signal; and
demodulating a second output of the second assembly of the at least two assemblies of vibrating membrane ultrasonic transducers into a second positive pulse signal.

23. The method of claim 22, further comprising recovering the binary data by combining the first positive pulse signal and the second positive pulse signal using a logic gate.

24. The method of claim 23, wherein the logic gate is an R-S gate.

* * * * *